UNITED STATES PATENT OFFICE.

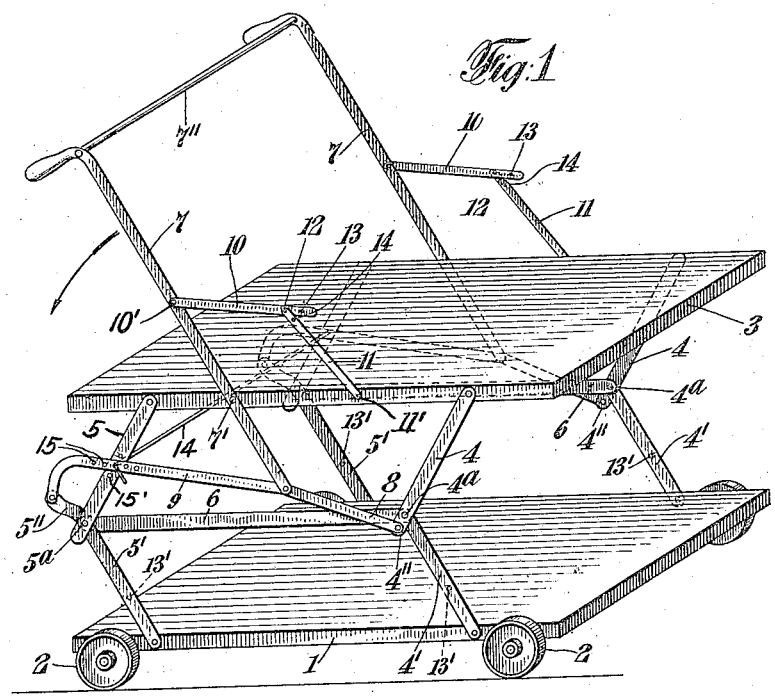

ROBERT C. LAFFERTY, OF NEW YORK, N. Y.

ELEVATING-TRUCK.

1,262,361.	Specification of Letters Patent.	Patented Apr. 9, 1918.

Application filed June 1, 1915. Serial No. 31,404.

*To all whom it may concern:*

Be it known that I, ROBERT C. LAFFERTY, a citizen of the United States, and a resident of the borough of Manhattan, city, county, and State of New York, have invented certain new and useful Improvements in Elevating-Trucks, of which the following is a specification.

My invention relates to elevating mechanism, and particularly to elevating trucks.

In many instances, it is desirable to elevate the level of the platform of a truck to bring it to the elevation of the platform from which the truck is being loaded or onto which it is being unloaded. Furthermore, it is desirable to have a truck the platform of which may be held at one position while it is being loaded from a floor or the like of given elevation, and which platform may then be elevated while the truck is still loaded to the level of a different floor or the like onto which it is desired to unload it.

One of the objects of my invention is to provide a truck of general application which has a platform the level of which may be varied.

Another object is to provide a truck with means for supporting a platform, whereby the platform may be moved to different levels, whether loaded or unloaded, and whereby the platform will be held at the levels to which it is brought.

Other and further objects and advantages of my invention will appear from this description, taken in connection with the hereunto annexed drawings forming a part of this specification, and will be pointed out in the hereunto appended claims.

In the drawings accompanying this description, in which like reference characters indicate similar parts, Figure 1 is a perspective view of a preferred form of an elevating truck embodying my invention, the truck being shown in partially elevated position;

Fig. 2 is a side view of a slightly modified form of the truck shown in Fig. 1, said truck being shown in fully elevated position;

Fig. 3 is a side view of the modification shown in Fig. 1, the truck being shown with its platform in its lowest position; and Fig. 4 is a detail view of the toggle lock for the moving handle.

In the form of elevating truck shown in Fig. 1, the body of the truck comprises a bed 1, onto which are attached rollers 2 of any well-known type. The platform 3, the level of which may be varied, is supported on the bed by jointed supports comprising the links 4 and 4′ and the links 5 and 5′, respectively. The links of these supports are pivoted together by the pins 4ᵃ and 5ᵃ, respectively. Joining the pins 4ᵃ and 5ᵃ are equalizing bars 6, so that, when the jointed supports are bent or straightened out to occupy the relative positions shown in Fig. 2, the supports will bend or straighten simultaneously, so that the platform will remain always parallel to the bed, no matter in what elevation it may lie. This is true because the links 4, 5 and 6 form, with the platform 3, a parallelogram, and the links 4′, 5′ and 6 form, with the bed, another parallelogram. Integral with the links 5′ at the upper end are extensions 5″, and integral with the links 4 at their lower extremities are extensions 4″. A handle for moving the truck is formed of the side bars 7 pivoted respectively on opposite sides of the platform at 7′ and joined together by the members 7″. Connecting the ends of the extension 4′ and the ends of the bars 7 are operating links 8, and connecting the ends of the extensions 5′ and the points where the operating links 8 are connected to the side bars 7 are second operating links 9.

From the structure so far described, it will be apparent that, if the moving handle is swung in the direction of the arrow in Fig. 1, the jointed supports will be straightened out and assume the position in which they are shown in Fig. 2, and the platform will be raised to its highest position. In order to hold the platform in its highest position, toggle locks are formed by pivoting links 10 to the side bars 7 and links 11 to the sides of the platform 3. The links 10 and 11 are pivoted together at 12, and a projection 13 on the link 10 is adapted to enter into a recess 14 in the link 11 after the pivot 12 has assumed a position below the line of the centers of the pivots 10′ and 11′ which attach the links 10 and 11, respectively, to the side bars 7 and the sides of the platform 3.

It will thus be seen that any pressure upon the moving handle will not cause the jointed supports to bend, because the moving handle is prevented from swinging about its pivots 7 by the toggle locks described. If, however, the center pivots 12 of the toggle locks are raised so that the pivots 12 come above the line of the centers of the pivots 10' and 11', the moving handle may be swung about its pivot 7' in a direction opposite to the arrow, and the jointed supports will be bent and the platform will be lowered to the position in which it is shown in Fig. 3.

In the links 4' and 5' are fixed pins 13', which contact with the upper surface of the bed when the platform is lowered, to prevent the platform from dropping down onto the bed.

By this construction, a double-decked platform is always provided.

The modification shown in Fig. 2 is exactly like that described, except that the moving handle 7ᵃ is bent where it is pivoted to the platform at 7', so that, when the platform is in its elevated position, the moving handle will be in approximately the same plane therewith, but, when the moving handle has been swung in the opposite direction to the arrow to lower the platform by bending the jointed supports, it will occupy a position at an angle to the platform and will be in convenient reach when the platform is lowered.

In the links 9 are a plurality of holes 15, and in the links 5 there are a plurality of holes 15', and as the links 9 move relatively to the links 5 as the platform is elevated or lowered, successive holes in the links 5 will register with corresponding holes in the links 9, and by inserting a rod 14 through corresponding registering openings the platform may be held at a plurality of different elevations.

While I have described an elevating truck with great particularity and detail, I do not intend that my invention shall be confined to the specific features herein disclosed, but intend that such modifications as may appear to those skilled in the art may be made without departing from my invention, so long as such modification shall come within the scope of the hereunto appended claims, which I intend shall alone define and limit my invention.

I wish it to be clearly understood that, while I have used the terms "platform" and "bed" in the disclosure of my invention, I do not intend that I shall be limited to a platform and bed of the type illustrated, but I may form either the platform or the bed in any way suitable to the requirements and in any number of parts having any desired construction.

What I claim and desire to secure by Letters Patent is the following:—

1. In an elevating truck, the combination of a platform, supports for said platform comprising links pivoted together, one link of each support having an extension, and lever mechanism connected to said extensions and to said platform to cause said supports to bend and straighten.

2. In an elevating truck, the combination of a platform, supports for said platform comprising links pivoted together, one link of each support having an extension, and a moving handle for said truck and comprising a bar pivoted to said platform and connected to said extensions.

3. In an elevating truck, the combination of a platform, supports for said platform comprising links pivoted together, one link of each support having an extension, a moving handle for said truck and comprising a bar pivoted to said platform, and links connecting said bar and extensions.

4. In an elevating truck, the combination of a platform, mechanism for elevating said platform, a moving handle pivoted to said platform and operatively connected to said mechanism, and automatic means for locking said handle in position upon movement of said platform to an elevated position.

5. In an elevating truck, the combination of a platform, mechanism for elevating said platform, a moving handle pivoted to said platform and operatively connected to said mechanism, and a toggle connected to said platform and handle whereby said handle is locked in position upon movement of said platform to an elevated position.

In testimony whereof, I have signed my name to this specification.

ROBERT C. LAFFERTY.

Copies of this patent may be obtained for five cents each, by addressing the "Commissioner of Patents, Washington, D. C."